United States Patent [19]

Gagen et al.

[11] Patent Number: 4,627,942
[45] Date of Patent: Dec. 9, 1986

[54] METHOD AND APPARATUS FOR RECOATING SPLICED END PORTIONS OF OPTICAL FIBERS

[75] Inventors: Paul F. Gagen, Duluth; Jane F. Kuhl, Atlanta; Stephen C. Mettler, Decatur; Carl R. Taylor, Lawrenceville, all of Ga.

[73] Assignee: AT&T Bell Laboratories, Murray Hill, N.J.

[21] Appl. No.: 706,268

[22] Filed: Feb. 27, 1985

[51] Int. Cl.$^4$ ............................................. B29D 11/00
[52] U.S. Cl. .................................... 264/1.5; 264/1.4; 264/36; 425/12; 425/13; 425/108; 425/218; 425/808
[58] Field of Search ........................ 264/1.4, 1.5, 36; 425/108, 808, 11, 12, 13, 218; 156/49, 94, 98, 158, 502

[56] References Cited

U.S. PATENT DOCUMENTS 2,267,372  12/1941  Calkins et al. ..................... 425/218
4,410,561  10/1983  Hart, Jr. ........................... 264/1.5
4,525,312   6/1985  Jones ............................... 264/1.5

OTHER PUBLICATIONS

"Injection Molding of Fusion Spliced Fiber", M. Ogai et al, OFC 1981, paper WC3.

Primary Examiner—James Lowe

[57] ABSTRACT

In order to recoat bared end portions (32—32) of optical fibers (34—34) which have been spliced together, the spliced portions of the fibers and portions adjacent thereto are positioned in a groove (51) of a base plate (43) of a mold and enclosed with a cover (60). The cover is slidably moveable relative to the groove to allow an injection nozzle (81) which extends through the cover to become aligned with the fiber. Coating material (92) is introduced through the nozzle into engagement with the spliced end portions after which the cover is moved relative to the base plate to shear across the coating material along the interface between the cover and the base plate. Movement is discontinued when a channel (86) in the cover becomes aligned with the recoated splice. This allows the coating material to be solidified in the presence of a free surface (90) which avoids the formation of bubbles in the coating material and causes the recoated portion to remain in engagement with the original coated portions adjacent to the spliced end portions.

10 Claims, 21 Drawing Figures

METHOD AND APPARATUS FOR RECOATING SPLICED END PORTIONS OF OPTICAL FIBERS

TECHNICAL FIELD

This invention relates to methods of and apparatus for the recoating of an optical fiber splice. More particularly, the invention relates to methods and apparatus for recoating end portions of optical fibers which have been spliced together.

BACKGROUND OF THE INVENTION

The use of lightguide communications involving the use of optical fibers has grown at an unprecedented pace. Typically, an optical fiber has a diameter on the order of 125 microns, for example, and is covered with a coating material which increases the outer diameter of the coated fiber to about 250 microns, for example. Optical fiber cables may comprise a plurality of these optical fibers which are stranded together or which are assembled in planar arrays which are referred to as ribbons.

The technology for forming low-loss optical fibers, which is shown for example in U.S. Pat. No. 4,217,027 which issued on Aug. 12, 1980 in the names of J. B. MacChesney and P. B. O'Connor, has advanced to a point where there is widespread commercial manufacture of optical fibers. Most processing includes drawing an optical fiber from a previously manufactured glass boule, sometimes referred to as a preform. During the drawing process, the fiber is usually coated with a protective, curable material which may be cooled or cured thermally, by radiation, or by other suitable techniques for achieving solidification.

The introduction of optical fiber applications to ever-more hostile environments, such as in underwater cable, has required that more stringent requirements be imposed on physical properties of the fiber, such as strength. For these more demanding applications, as well as for other less demanding ones, it has become increasingly more common to splice optical fibers which have broken, either accidentally, or during appropriate proof testing. Additionally, extremely long lengths of fiber may be obtained by splicing a plurality of lengths which are obtained using current manufacturing techniques. For these and other applications, splicing in which the coating material is removed from end portions of two fibers which are then fused together end to end provides a viable means for joining the ends of two glass fibers with an acceptable loss. However, the recoating of the bared spliced fiber end portions continues as a problem to be overcome, especially while maintaining stringent requirements on dimensional and strength parameters associated with the coated fiber.

A method of recoating spliced end portions of optical fibers is disclosed in U.S. Pat. No. 4,410,561 which issued on Oct. 18, 1983 in the name of A. C. Hart, Jr. The method involves placing the spliced fiber end portions and adjacent portions within a cavity in the form of a groove such as a semicircular or V-groove in a split mold. The effective diameter of the groove is somewhat greater than that of the remaining coated portion of each fiber. The fibers are positioned so that only the coated portions of the fibers touch the surface which defines the groove, while the vulnerable, uncoated spliced end portions of the fibers remain suspended and do not contact the groove surface. Then, the mold is covered to enclose the groove and a suitable curable coating material is injected into the groove to recoat the bared, spliced fiber end portions and contact the adjacent originally coated portions of the spliced fibers. The coating material is then cured to yield a recoated splice section with a transverse cross-section which is essentially identical to that of the original coated fiber.

This patented molding process provides a recoated splice; however, it has been determined that bubbles may occur in the recoating. The existence of bubbles may lead to stress concentrations when the fiber is handled subsequently. This is particularly undesirable in underwater cables where splices are inaccessible and under stress for many years. Long term integrity of the fiber may also be affected by the failure of the recoating material to overlap the original coating material on the portions of the fibers adjacent to the spliced end portions.

It has been determined that there are three sources of bubbles. These are air already present in the recoating material, air entrained during the molding process, and bubbles formed during the shrinkage of the recoating material during its cure. The bubbles due to shrinkage tend to be concentrated at the interface between the coating on the unbared fiber portions and the recoating material. This is caused by the pulling away of the recoating material from the coating material on the unbared fiber portions during curing. Because of the relatively long length of the portions to be recoated compared to the cross-section of the coated fiber and because the mold cavity is enclosed completely, the longitudinal shrinkage cannot be compensated for by uninhibited contraction transverse to the longitudinal axes of the fiber end portions. The coating material contacts and tends to adhere to an immovable surface around the entire periphery of the mold cavity which inhibits its contraction. Also, surface craters can derive from bubbles that break apart or in the recoating material that pulls away from the mold irregularly because of surface adhesion during cure. Craters over 1-2 mils in depth approach the surface of the fiber and may not protect it adequately from damage.

Inadequate overlap between the recoating material and the original coating material on the unbared portions of the fibers is another problem. It may result in the separation of the existing and recoating materials and expose the bare fiber.

As should be evident, there is still a need for methods and apparatus which may be used to recoat bared end portions of optical fibers which comprise a splice and to do so in a manner which avoids the formation of bubbles. Further, the methods and apparatus must be effective to provide continuity of coating material at the ends of the splice where the original coating material on the unbared portions of the coated fibers meets the recoating material.

SUMMARY OF THE INVENTION

The foregoing problems have been overcome by the methods and apparatus of this invention. In a method of coating a length of an optical fiber, a coating material which is capable of becoming solidifed and which contracts during solidification is caused to encapsulate the length of the optical fiber which is positioned in a groove of a mold. The coating material is caused to become solidified while allowing the coating material about a predetermined portion of its periphery in the mold cavity along the length of the optical fiber to be substantially uninhibited in its contraction. This may be accomplished by providing the coating material during its solidification with a free surface which extends along the length of the optical fiber which is to be coated.

In a method of recoating end portions of optical fibers which have had coating material removed therefrom and spliced together, the spliced portions and adjacent portions of the fibers are positioned in a groove. The groove is covered and an injection nozzle is aligned with a dump cavity. Recoating material is flowed from the nozzle into the dump cavity to evacuate any air from the nozzle. Afterwards, the nozzle is shifted to be aligned with the spliced fibers and coating material is flowed into the groove to encapsulate the bared end portions of the fibers which comprise the splice. The coating material is sheared along a plane extending across the top of the groove after which the coating material is exposed to create a free surface which extends along the length of the spliced end portions and which is movable upon contraction of the coating material about the splice. The recoating is allowed to cure while exposed to air and is free to contract about the fiber splice without creating any bubbles or voids. Then the recoated fiber end portions are removed from the groove.

An apparatus for recoating spliced end portions of optical fibers includes a mold base plate which includes a groove for receiving optical fibers, the end portions of which have been spliced together. The apparatus includes a mold cover which is disposed over the groove. The cover includes a channel which has a width that is substantially greater than that of the groove and which extends parallel to the groove. An injection nozzle extends through the cover and opens to a surface which covers the groove. The cover is mounted slidably relative to the base plate and in an initial operation, the nozzle is aligned with a dump cavity in the mold to one side of the groove. Coating material is caused to flow through the nozzle into the dump cavity to evacuate air from the nozzle. Then the cover is moved slidably to align the nozzle with the groove. Again, coating material is caused to be flowed through the nozzle into the groove, this time to coat the bared end portions of the fibers which are spliced together. The slidable mounting of the cover allows it to be shifted to shear across the coating material in the groove and to cause the channel to become aligned with the groove. The sliding action allows the groove to remain filled with the coating material. The alignment of the channel with the groove provides the coating material with a free surface and allows the coating material to cure without any bubbles being formed therein. Also, this sliding action which causes the cover to be positioned with the channel aligned with the groove allows the cover to be removed without disturbing the coating material. The cover is assembled to the base plate in a manner which allows its removal therefrom to permit removal of the recoated spliced fiber end portions.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 is an exploded perspective view of an apparatus for recoating spliced end portions of optical fibers positioned in a cavity such as a groove of a mold;

DETAILED DESCRIPTION

Referring now to FIG. 1, there is shown an apparatus which is designated generally by the numeral 30 and which is used to coat a length of an optical fiber. In a preferred embodiment, the apparatus 30 is used to recoat bared end portions 32-32 (see FIG. 2) of coated optical fibers 34-34 which have been spliced together. The optical fibers 34-34 are well known and each includes an optical fiber 36 having a coating material 38 applied thereon. Ana outer diameter of the coated optical fiber is on the order of 250 microns. The bared end portions 32-32 from which the coating material has been removed have been spliced together by a technique such as fusion bonding which is disclosed in an article entitle "Optical Fiber Joining Technique" which was authored by D. L. Bisbee and which appeared beginning at page 3153 of Vol. 50 No. 10 of the December 1971 issue of the Bell System Technical Journal. Each bared end portion 32 has a length of about 0.5 inch.

The apparatus 30 (see FIGS. 1 and 3-4) includes a support stand 41 for holding a mold 42. The mold 42, includes a base plate 43 which is secured to the support stand 41. At each end of the base plate is disposed a chuck 45, such as, for example, a vacuum chuck. Each chuck 45 includes a groove 47 which is adapted to hold a coated optical fiber with the grooves 47-47 in the two spaced chucks being aligned. Also the grooves 47-47 are aligned with a mold cavity in the form of a longitudinally extending groove 51 in the base plate 43. The groove 51 has a width of about 0.012 inch which is somewhat greater than the diameter of the coated optical fiber. Typically, the width of the mold groove 51 will be less than d, the diameter of the coated fiber, plus 0.006 inch, and usually less than d+0.002 inch. Ideally, the difference between the width of the groove 51 and the diameter of the coated optical fiber should be as small as possible to obtain a coated fiber with a diameter as uniform as possible. Further, the wall which defines the groove 51 is flared outwardly where the groove opens to a top surface 52 of the base plate 43 (see FIG. 5).

As can be seen in FIG. 1, the base plate 43 includes two sets of openings 53-53 defined by threaded walls and two sets of guide pins 55-55. The guide pins 55-55 are upstanding from the top surface 52 of the base plate 43. Also, the base plate 43 has a cavity 59 formed therein and disposed between the two sets of guide pins. The cavity 59 is referred to as a dump cavity.

Figures 2, 3:
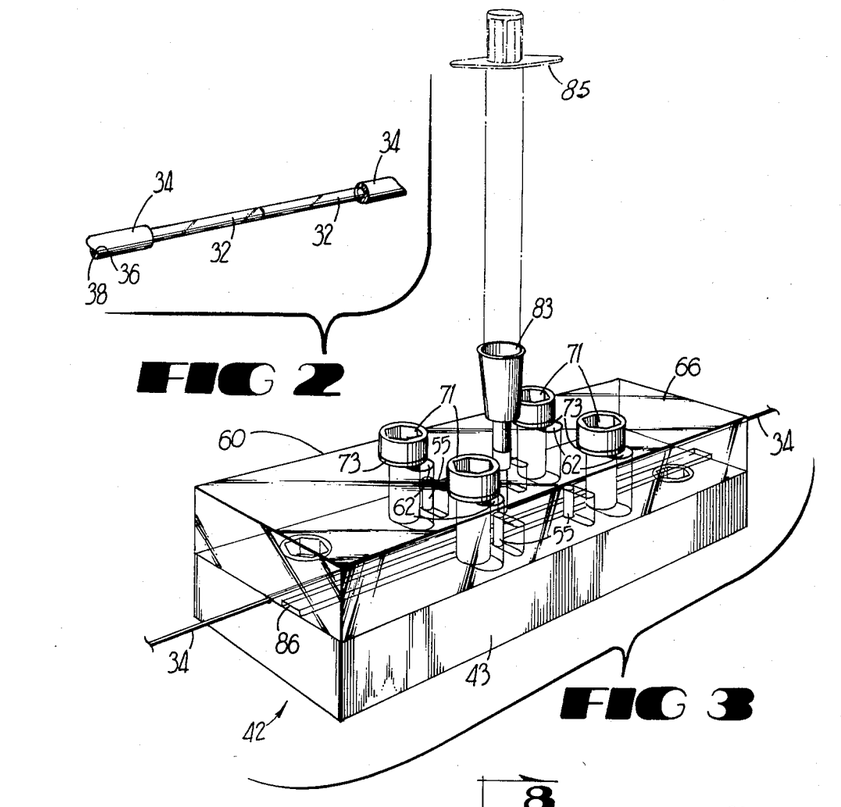
FIG. 2 is a perspective view of spliced end portions of optical fibers.
FIG. 3 is a perspective view of the apparatus of FIG. 1 as assembled.
Figure 4:
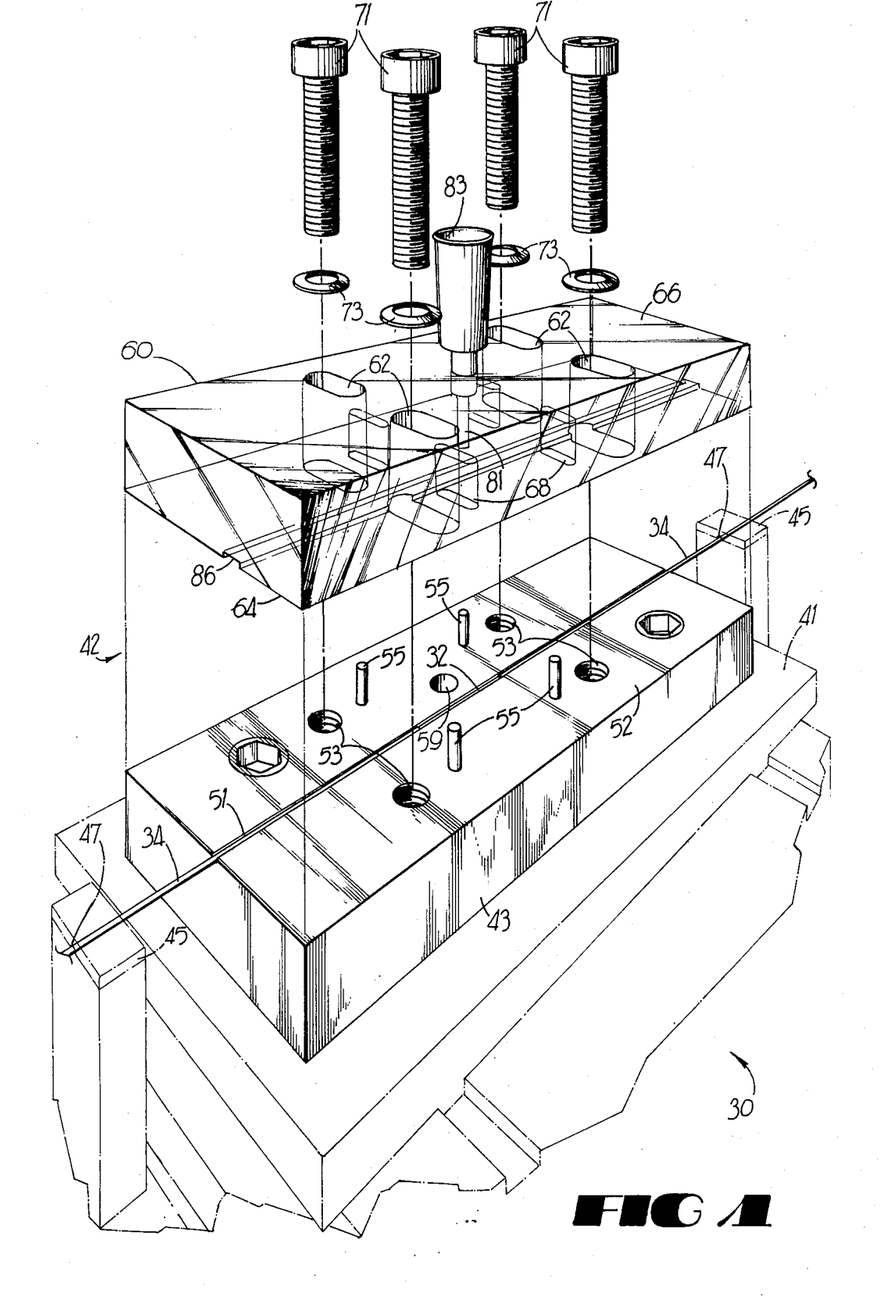
FIG. 4 is a plan view of the apparatus of FIG. 3.

Adapted to be mounted on the base plate 43 is a cover 60 (see again FIGS. 1 and 3-4). The cover 60 is approximately the same size as the base plate 43 and includes two sets of oblong openings 62-62 which extend from a lower surface 64 to a top surface 66 thereof. The openings 62-62 are such that when the cover 60 is positioned over the base plate 43 with the openings 62-62 aligned with the openings 53-53, two sets of oblong blind holes 68-68 in the cover are aligned with the pins 55-55. The blind holes 68-68 open to the surface 64 of the cover 60. The slotting of the openings 62-62 and of the blind holes 68-68 facilitate movement of the cover 60 with respect to the base plate 43 in a direction transversely of the longitudinal axes of the spliced fibers (see FIG. 4).

The cover 60 is attached to the base plate 43 with a plurality of bolts 71-71 which are inserted through spring washers 73-73 into and through the oblong openings 62-62 and into the aligned threaded holes 53-53. The washers 73-73 are such that when the bolts 71-71 are turned threadably into the holes 53-53 and secured in engagement with the washers resting on the top surface 66 of the cover 60, the cover may be moved slidably transversely of the base plate 43.

The apparatus 30 also includes facilities for introducing a coating material into the groove 51, after it has been enclosed with the cover 60, to provide a recoating for the spliced end portions. These facilities include an injection nozzle 81 and a needle 82 (see FIGS. 1 and 3-6) which extend through the cover 60 and which are connected to a funnel 83. The funnel 83 is adapted to be connected through a fitting to a syringe 85 (see FIG. 3) which is used to pressurize coating material and cause it to be injected into the groove. The coating material is one which contracts during solidication. In a preferred embodiment, the coating material is an ultraviolet-radiation-cured (UVRC) coating material such as, for example, a urethane acrylate. Also, it is one which adheres chemically to the coating material on the unbared portions and to the optical fiber 36. The coating material typically is the same as that which covers the unbared portions of the fibers.

Figure 5:
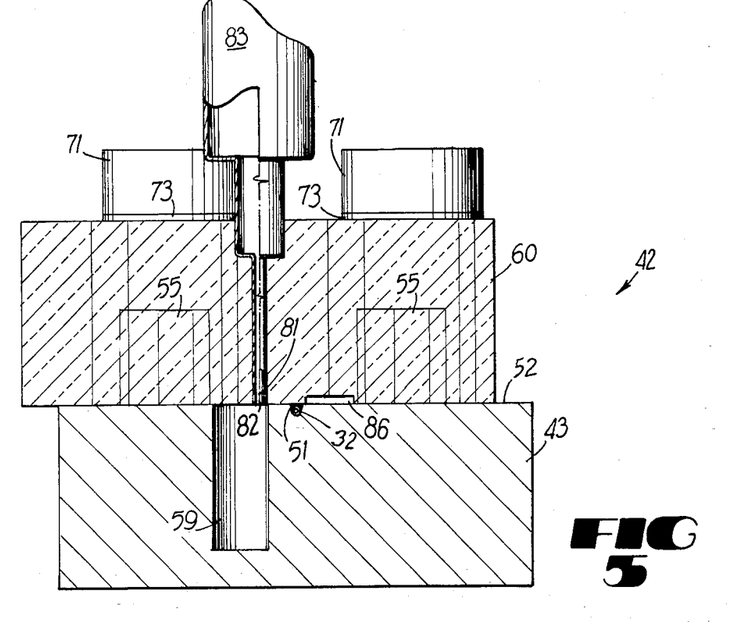
FIG. 5 is an end view of the apparatus of FIG. 3, partially in section, which shows an injection nozzle aligned with a dump cavity.
Figure 6:
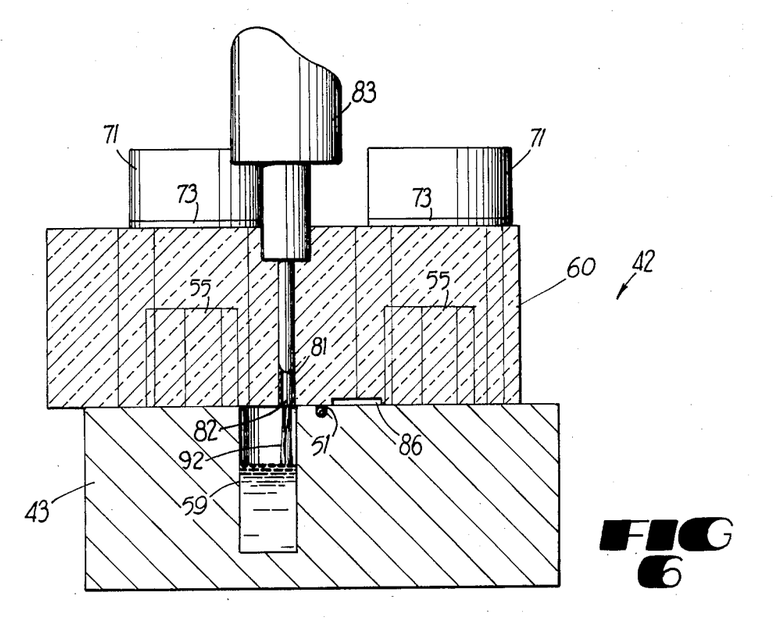
FIG. 6 is a partially sectioned end view of the apparatus of FIG. 3 as coating material is moved out of the injection nozzle into the dump cavity.
Figure 7:
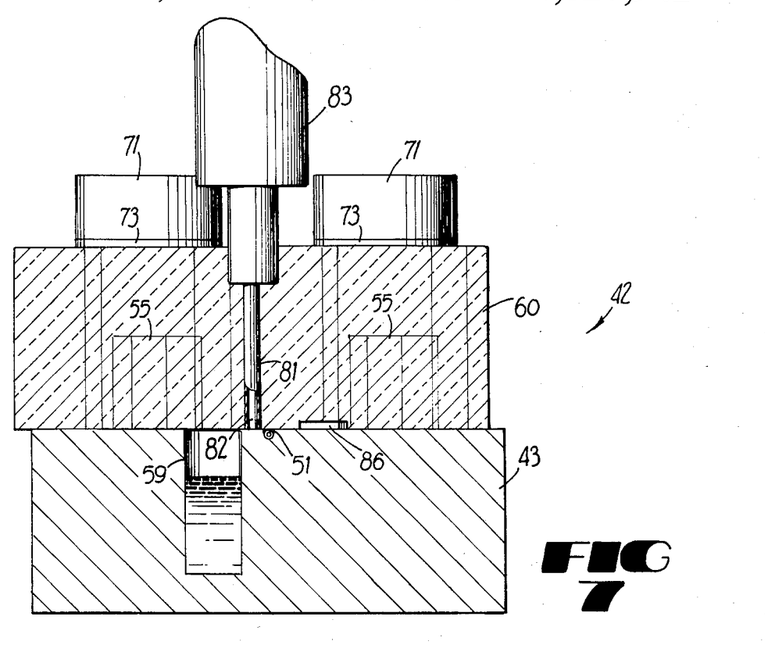
FIG. 7 is a partially sectioned end view of the apparatus of FIG. 3 after the injection nozzle has been moved out of alignment with the dump cavity.

The nozzle 81 is positioned in the cover 60 so that when the cover has been moved to one position relative to the base plate 43, that is, when each pin 55 is between ends of its associated slotted opening 68 (see FIG. 4), the nozzle becomes aligned with the dump cavity 59 (see FIGS. 5-6). The nozzle 81 also arranged so that when the cover 60 is moved transversely of the base plate 43 (see FIG. 7) to cause the pins 55-55 to engage ends of their slotted openings, the nozzle becomes aligned with the groove 51 (see FIGS. 8 and 9A) and the spliced fibers positioned therein. This of course, allows the introduction of the curable coating material into the groove 51 to encapsulate the spliced end portions of the fibers therein.

As can be seen in the exploded view of FIG. 1 and in FIG. 2, the cover 60 also is formed to include a channel 86 which opens to the surface 64 and which extends longitudinally along the cover parallel to the groove 51. The channel 86 has a width substantially greater than the width of the groove 51. Further, the channel 86 is positioned in the cover 60 so that when the cover is moved to cause the pins 55-55 to engage opposite ends of the slotted openings 68-68 and to align the injection nozzle 81 with another portion of the dump cavity 59, the channel becomes aligned with the groove 51 (see FIGS. 9B, 9D and 10).

The alignment of the channel 86 and the groove 51 is important to the effective recoating of the spliced end portions of the fibers. Having the channel 86 aligned with the groove 51 effectively provides the coating material which has been introduced into the groove 51 with a free surface 90 (see FIGS. 9B and 9C). A free surface is defined as the boundary or interface between two homogeneous fluids. Unlike in a prior art apparatus where the coating material and the fibers were positioned in a covered groove, the coating material herein has a free surface alaong the length of the spliced end portion 32-32.

It has been found that if the coating material has a free surface, as in the preferred embodiment, bubbles do not form in the coating material as it is solidified. In the prior art arrangement, coating material was injected into an enclosed mold cavity in the form of a groove to encapsulate the fiber therein. During curing, the coating material shrinks by about 6% by volume. When the coating material cured in the prior art arrangement, it was drawn toward two opposing surfaces, that of the fiber and of the wall defining the closed groove. As it shrunk, the coating material tended to adhere to the mold surfaces which surrounded completely the coating material. In other words, the volumetric contraction of the coating material was inhibited about the entire periphery of the mold surface thereby preventing redistribution of the coating material during curing which could prevent substantially the formation of bubbles. As a result, the material tended to have voids formed therein. During subsequent handling of such fibers, stress concentrations which may develop in the vicinity of the bubbles may cause failure of the coating material. In the arrangement of this invention, contraction of a portion of the coating material along the length of the spliced end portions 32-32 is substantially uninhibited.

Further, when using the prior art technique, with the fiber positioned in a closed mold cavity, the coating material shrinks away from the interface with the existing coating material at the ends of the spliced portions 32-32. The probability of longitudinal separation is relatively high because of the length of the recoating material compared to the cross-sectional dimensions and the fact that a covered groove provides no relief to longitudinal contraction by uninhibited contraction in a plane transverse to the groove. On occasion, this has resulted in portions of the splice remaining bare. For example, at the interface, a thin coating was applied over the existing coating on the fiber portions adjacent to the spliced end portions and on cure adhered to it. When shrinkage occurred, this thin coating could not pull away from the existing coating and separation in the coating material was experienced.

With the present arrangement, the free surface 90 precludes the pulling away of the coating material from that at the ends of the splice. A portion of the injected coating material overlaps the existing coating material adjacent to the spliced end portions. But unlike in the priorly used technique, the free surface permits the coating material between the free surface and the splice to experience substantially uninhibited contraction allowing a redistribution of the coating material which prevents separation at the ends of the splice. As a result, the entire length of the splice remains recoated after solidification.

In using the methods and apparatus of this invention, a craftsperson aligns the spliced fibers over the groove 51 in the base plate 43 and the aligned grooves 47-47 in the chucks 45-45 at the ends of the base plate (see FIG. 1). Then vacuum is applied to the chucks 45-45 to secure the spliced fibers within the grooves 47-47 in the chucks. When the spliced fibers are positioned within the groove 51, they may be subjected to a slight tension to prevent sagging and contacting the bottom surface of the groove. The chucks maintain the fibers centered substantially in the groove 51 to facilitate a uniform coating.

After the spliced fibers have been positioned within the groove 51 of the base plate 43, the cover 60 is aligned with and secured to the base plate (see FIG. 3). This is accomplished so that the pins 55-55 are received in the oblong blind holes 68-68. Then the bolts 71-71 are caused to be turned threadably into the holes 53-53 in the base. Prior to the tightening of the bolts 71-71, the cover 60 is shifted to a position to cause the injection nozzle to become aligned with the dump cavity 59 (see FIG. 5). The bolts 71-71 are secured, after which a liquid, curable coating material 92 is flowed into the funnel 83, through the injection nozzle 81 and needle 82 and into the dump cavity (see FIG. 6). This causes the coating material to push out any air ahead of it thereby preventing the movement of air into the groove 51 ahead of the coating material.

Figure 8:
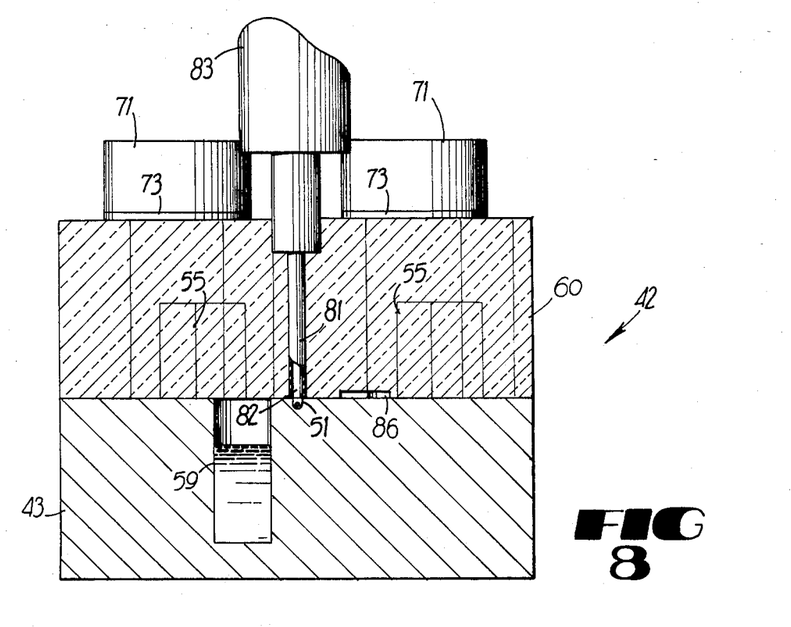
FIG. 8 is an end view of the apparatus of FIG. 3, partially in section, after the injection nozzle has been aligned with the optical fibers in the groove.
Figure 9A:
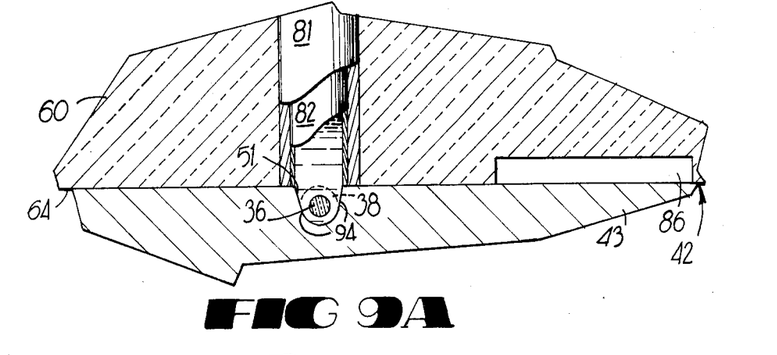
FIGS. 9A–9D are a sequence of detailed views to show steps of the method of this invention.

In a next step of the method of this invention, the cover 60 is shifted transversely of the groove 51 (see FIG. 7) to position the injection nozzle 81 in alignment with the groove 51 (see FIGS. 8 and 9A). Then coating material 92 is introduced into the funnel 83 to cause it to flow through the injection nozzle and into the groove 51. The curable coating material encapsulates the bared spliced end portions of the fibers in the groove 51 and flows in opposite directions until it contacts and overlaps slightly the existing cured coating material on the fiber portions adjacent to the bared end portions. The overlap occurs because, as will be recalled, the groove cross-section is slightly greater than that of the coated fiber. This geometry also allows air to be pushed out ends of the base plate 43 as the coating material is injected into the groove 51.

Figure 9B:
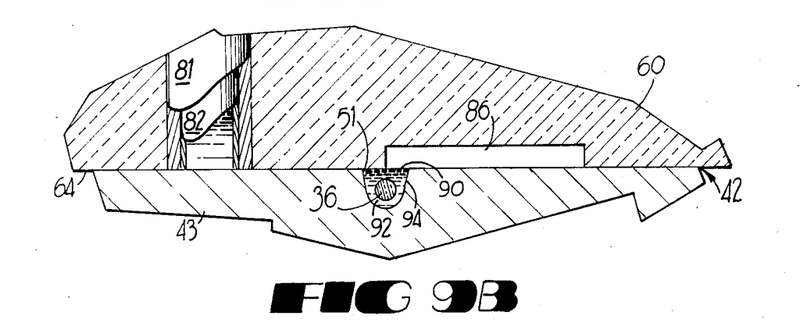
Figure 9C:
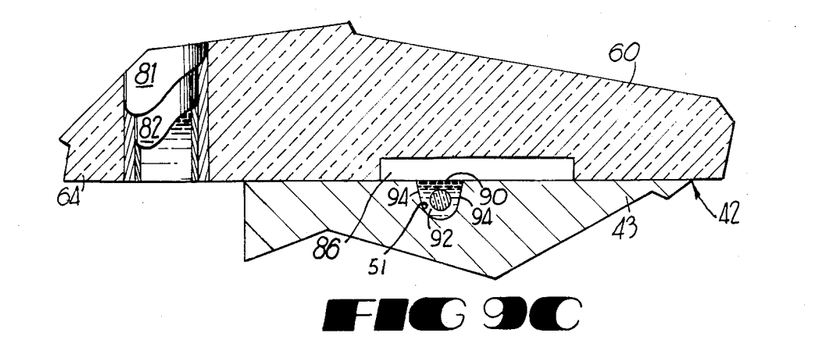
Figure 9D:
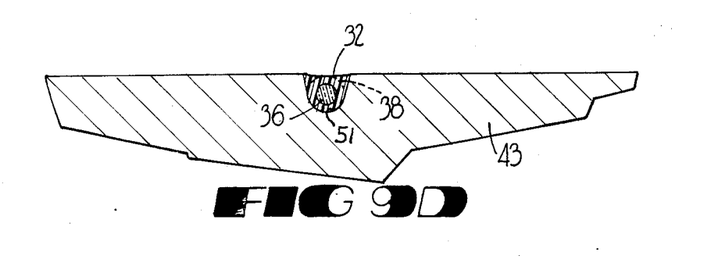
Figure 10:
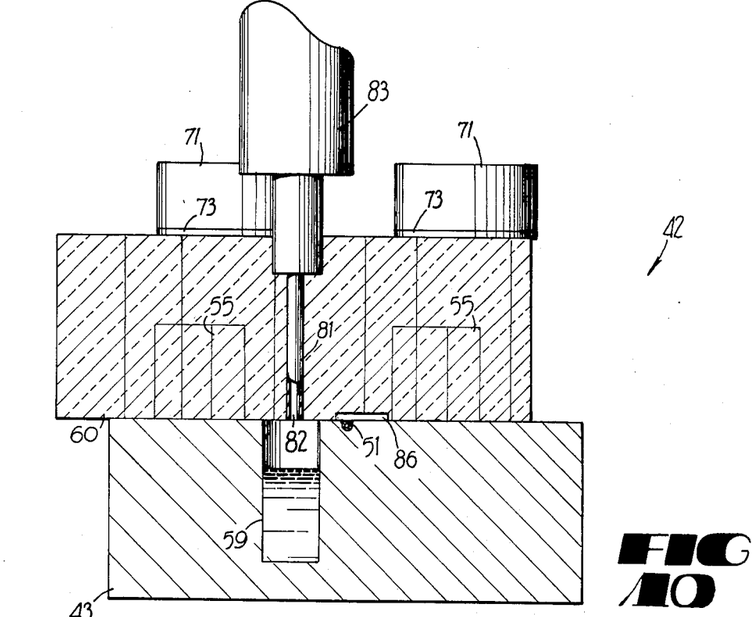
FIG. 10 is an end view of the apparatus of FIG. 3, partially in section, after the cover has been moved to shear across the coating material.

The the craftsperson causes the cover 60 to be shifted laterally to cause the nozzle to be repositioned over the dump cavity 53 (see FIGS. 9B, 9C and 10). This movement causes the underside of the cover to shear across coating material at the interface between the groove 51 and the cover, and causes the channel 86 to be come aligned with the groove 51. This sliding action causes excess coating material 92 at the exit of the nozzle 81 to be sheared through and separated from the coating material in the groove 51. Advantageously, the shearing action removes excess material in the nozzle without disturbing the coatiing material in the groove 51. As a result, the coating material 92 in the groove 51 is caused to have the free surface 90 (see FIG. 9C) and does not engage a surface overhead of the groove. The movement of the cover to cause the channel 86 to become aligned with the groove 51 allows the cover subsequently to be removed from the mold plate without disturbing the coating material in the groove 51.

Figure 11:
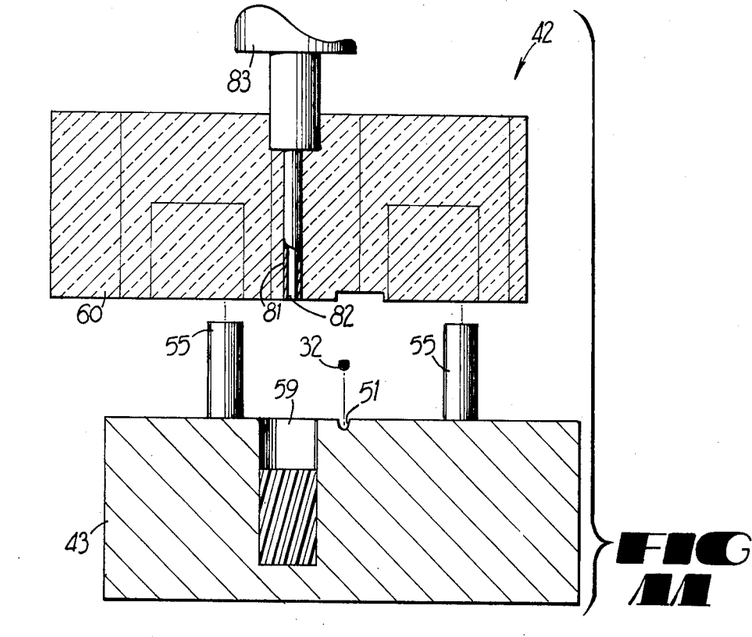
FIG. 11 is an end view of the apparatus of FIG. 3 to show the separation of the cover from the mold and the removal of the spliced recoated fiber end portions from the groove after the recoating material has been solidified.

At this time, the cover 60 is removed from the base (see FIG. 11). This is accomplished without removing any of the coating material because the channel 86 is aligned with the groove 51. The removal of the cover 60 allows the coating material to be cured by UV radiation during exposure to ambient air (see FIG. 9D). Of course, the cover 60 could be made of a material which is transparent to UV radiation and left in place during the curing of the coating material.

When the coating material 92 cures and becomes solidifed, bubbles are not created within the coating material and the coating material does not shrink away from the existing coating material 38 adjacent to opposite ends of the spliced end portions. The existence of the free surface 90 allows the coating material 92 between the free surface 90 and the splice to contract in an uninhibited manner toward the fiber end portions to accommodate the longitudinal shrinkage. This prevent substantially any cavitation or void formation within the recoated region.

After the coating material 92 has been cured by UV radiation, for example, the craftsperson removes the spliced fibers with the end portions thereof being recoated uniformly (see FIG. 11). As will be recalled, the groove 51 in the base 43 is formed to have a configuration which may be semi-circular or V-shaped, for example. However for the semi-circular configuration where the groove 51 meets the top surface of the base plate 43, walls 94-94 (see FIG. 9C) are flared outwardly from the groove. This facilitates the removal of the recoated portions of the joined fibers and obviates the prior art technique of using a release agent on the walls of the groove 51. The use of a release agent may be detrimental to obtaining a suitable bond at the interface between the original coating material and the recoating on the splice.

Figure 12:
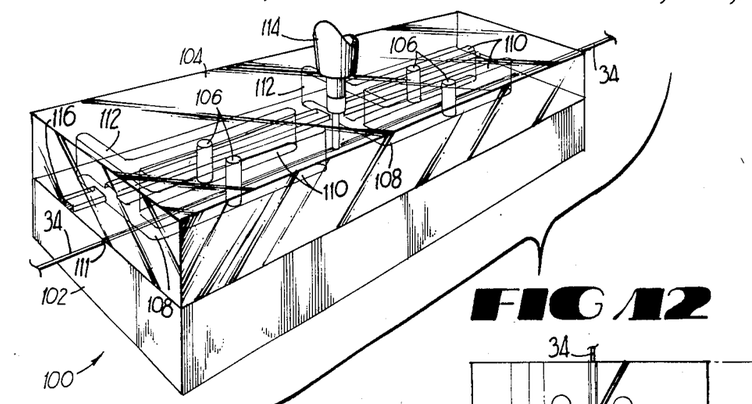
FIG. 12 is a perspective view of an alternative embodiment of the apparatus to show an injection nozzle aligned with the fibers and a groove in a mold.
Figure 13:
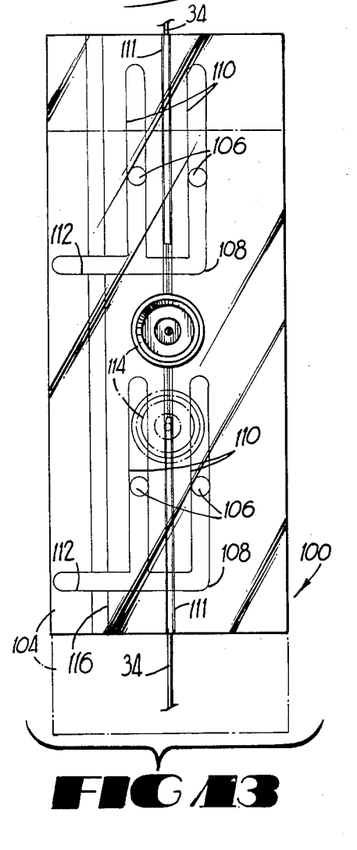
FIG. 13 is a plan view of the alternative embodiment of FIG. 12 with the cover shownn an original and in a position moved along the spliced fibers.
Figure 14:
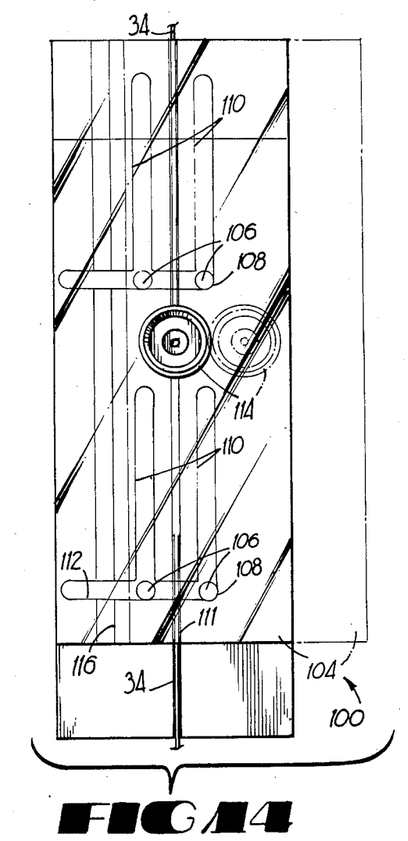
FIG. 14 is a plan view of the apparatus of FIG. 12 with the cover in position to be shifted transversely of the fibers to shear across the coating material.

In another embodiment of this invention which is shown in FIGS. 12-14, an apparatus 100 includes a base plate 102 and a cover 104. The base plate 102 includes a plurality of guide pins 106-106. Each of the pins 106-106 is received in a guide slot 108 in the cover 104 when the cover is positioned in engagement with the base plate 102. Unlike in the preferred embodiment, the guide slots 108-108 in the apparatus 100 each include a portion 110 which extends longitudinally with a groove 111 which receives the spliced end portions of the fibers and a portion 112 transverse thereto. An injection nozzle 114, is mounted on the cover 104 and is moved along the base plate 102 with the cover as the pins 106-106 move along the portions 110-110 of the slots 108-108 (see FIG. 13). This causes the nozzle 114 to introduce coating material into the groove 51 in which has been positioned joined fibers 34-34 having bared spliced end portions 32-32. then the cover 104 is moved laterally of the base 102 (see FIG. 14) with the pins 106-106 following the guide groove portions 112-112 until a channel 116 in the underside of the cover is aligned with the groove 111. The cover 104 is removed and the coating material is cured as before.

Figure 15:
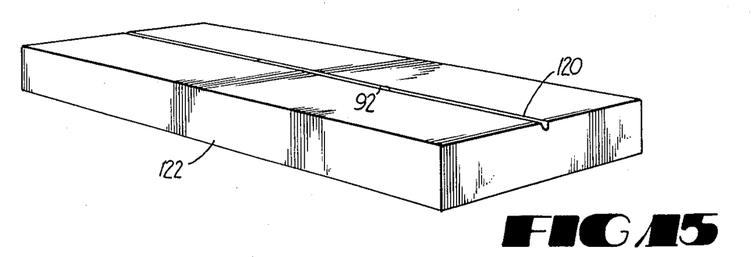
FIGS. 15–17 are a sequence of perspective views to show another alternative embodiment for recoating spliced end portions of optical fibers.
Figure 16:
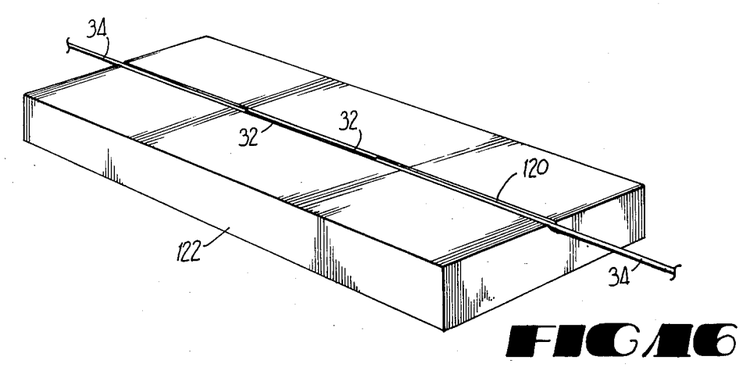
Figures 17, 18:
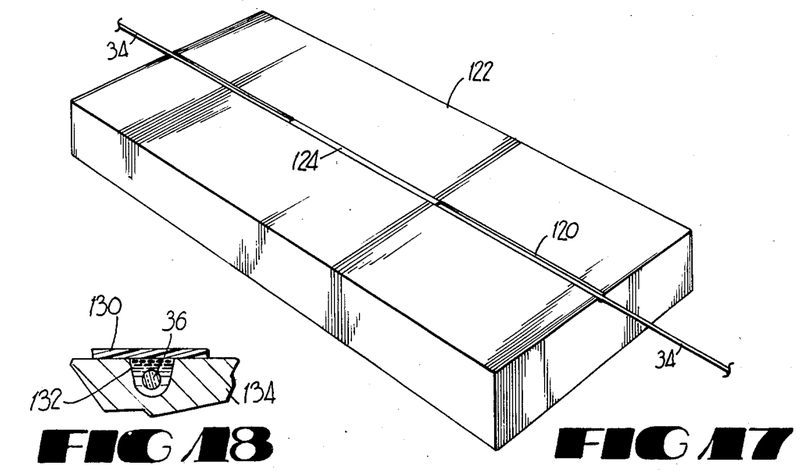
FIG. 18 is an enlarged view of still another embodiment of this invention.

In still another embodiment, coating material 92 intnroduced into a portion of a groove 120 (see FIG. 15) of a base plate 122. Then the spliced bared end portions of the joined fibers are positioned in the groove 120 (see FIG. 16) and the coating material cured by ultraviolet radiation (see FIG. 17) to form a recoated portion 124. The coating material has a viscosity which is sufficiently high at room temperature so that it remains substantially in the portion of the groove until the spliced fiber end portions are positioned in the groove. Again, the coating material has a free surface which in this instance is exposed to the atmosphere.

It should be apparent after the foregoing that the curing of the coating material can be accomplished with a membrane 130, which is transparent to UV radiation, spanning across a groove 132 (see FIG. 18) in a mold 134. The membrane may be semi-rigid and semi-permeable to allow air to reach the coating material. The coating material may be introduced through an opening (not shown) in the membrane. In the alternative, the membrane may be relatively thin and capable of being penetrated by a syringe, for example, to allow the coating material to be introduced. In the latter case, the membrane is capable of moving inwardly with the coating material as the coating material contracts during its curing. Accordingly, the coating material which is adjacent to the membrane is free to move inwardly toward the spliced end portions such that its contraction is uninhibited. This allows the coating material around the spliced end portions of the fibers to become redistributed during the curing process and prevents the formation of bubbles and/or surface craters.

It is to be understand that the above-described arrangements are simply illustrative of the invention. Other arrangements may be devised by those skilled in the art which will embody the principles of the invention and fall within the scope and spirit thereof.

What is claimed is:

1. A method of recoating bared, spliced end portions of optical fibers, said method including the steps of:
   positioning bared spliced end portions of optical fibers in a groove which opens to a surface of a base plate;
   enclosing the groove with a cover which includes a channel and which engages the surface of the base plate;
   introducing a curable coating material into the groove to encapsulate the bared spliced end portions of the optical fibers;
   causing relative movement between the baseplate and the cover along the surface of the base plate to shear across the coating material in the groove to align the channel in the cover with the groove and thereby cause the coating material in the groove to have a free surface which is effective to allow a portion of the coating material to be substantially uninhibited during its contraction to facilitate redistribution of coating material and to avoid the formation of voids therein;
   curing the coating material which encapsulates the spliced end portions of the fibers; and
   removing the recoated spliced end portions form the groove.

2. The method of claim 1, wherein prior to the step of curing the coating material in the groove, the cover is removed.

3. The method of claim 1, wherein the length of the bared spliced end portions is substantially greater than the width of the coating material which encapsulates the spliced end portions.

4. An apparatus for coating a portion of an optical fiber, said apparatus including:
   a mold plate which includes a groove for holding the portion of the optical fiber, said groove communicating with a surface of said mold plate;
   cover means for enclosing the groove, said cover means including a channel which extends parallel to the groove;
   injection means for introducing a coating material into the groove to encapsulate the portion of the optical fiber; and
   means for mounting said cover means to facilitate relative movement between said mold plate and said cover means between one position whereat said injection means is aligned with the groove to permit introduction of the coating material into the groove and another position where the channel is aligned with the groove to allow the coating material to be cured while it is exposed to a free surface, the relative movement between the cover means and the mold plate between the two positions causing a shearing across the coating material along the surface of the mold plate to which the groove opens.

5. The apparatus of claim 4, wherein the length of the portion of the fiber to be coated is substantially greater than the width of the groove, and wherein the channel has a width that is substantially greater than the width of the groove.

6. The apparatus of claim 5, wherein the groove is generally semi-circular and wherein portions of the groove adjacent to its open face are flared outwardly from a center of the groove.

7. The apparatus of claim 4, wherein the coating material is a UV curable coating material and wherein at least a portion of said apparatus is essentially transparent to UV radiation necessary to cure the UV curable coating material.

8. The apparatus of claim 4, wherein said mounting means is adapted to permit motion in a direction transverse to the groove and to permit removal of said cover means.

9. The apparatus of claim 4, which includes means for moving said injection means and said cover means in a direction along the groove to cause coating material to be introduced into the groove to encapsulate the fiber in the groove.

10. The apparatus of claim 9, wherein after the fiber has been encapsulated, said cover means is capable of being moved transversely of the fiber.

* * * * *